(12) United States Patent
Huang

(10) Patent No.: US 12,026,036 B2
(45) Date of Patent: Jul. 2, 2024

(54) DISTRIBUTED TRACING IN A MICROSERVICES-BASED SYSTEM

(71) Applicant: SAP SE, Walldorf (DE)

(72) Inventor: Xinrong Huang, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/072,253

(22) Filed: Nov. 30, 2022

(65) Prior Publication Data

US 2024/0176688 A1    May 30, 2024

(51) Int. Cl.
*G06F 11/00*    (2006.01)
*G06F 11/07*    (2006.01)
*G06F 11/34*    (2006.01)

(52) U.S. Cl.
CPC ...... *G06F 11/0712* (2013.01); *G06F 11/3476* (2013.01)

(58) Field of Classification Search
CPC .............. G06F 11/0712; G06F 11/3476
See application file for complete search history.

(56) References Cited

U.S. PATENT DOCUMENTS

| 9,778,957 B2 * | 10/2017 | Colson ............. G06Q 10/06311 |
| 11,347,622 B1 | 5/2022 | Agarwal et al. |
| 2012/0109930 A1 * | 5/2012 | Prasad ................... G06Q 10/06 707/E17.108 |
| 2019/0243688 A1 * | 8/2019 | Karmarkar ............ G06F 9/5083 |
| 2021/0326184 A1 * | 10/2021 | Muraleedharan ....... G06F 21/53 |
| 2021/0350310 A1 * | 11/2021 | Tashkin ........... G06Q 10/06398 |

OTHER PUBLICATIONS

Extended European Search Report, dated Apr. 10, 2024, for European Patent Appl. No. 23203364.7, 8 pages.

* cited by examiner

*Primary Examiner* — Amine Riad
(74) *Attorney, Agent, or Firm* — Sterne, Kessler, Goldstein & Fox P.L.L.C.

(57) ABSTRACT

Disclosed herein are system, method, and computer program product embodiments for providing distributed tracing in a computing system comprising a plurality of microservices. An embodiment operates by transmitting, from a first microservice, a request associated with a task to a second microservice. The embodiment generates distributed tracing data associated with the request, comprising: propagating trace context associated with the request between the first microservice and the second microservice; propagating the trace context associated with the request between operators within the first microservice; and propagating the trace context associated with the request between functions within the first microservice or the second microservice. The embodiment receives, from the second microservice, a response associated with the task. The embodiment then ceases, at least based on the response, generating the distributed tracing data associated with the request.

20 Claims, 13 Drawing Sheets

FIG. 8A

| Service & Operation | ∨ > ≫ ≫ | 0μs | 85.53ms | 171.05ms | 256.58ms | 342.1ms |
|---|---|---|---|---|---|---|
| ∨ rms-worker agent.read.GetWorkOrder | | | | | | |

850 agent.read.GetWorkOrder     Service: rms-worker   Duration: 342.1ms   Start Time: 0μs

∨ Tags

| | |
|---|---|
| internal.span.format | jasper |
| otel.library.name | agent |
| rms.workorder.delimitation | 5 |
| rms.workorder.id | 83b371a7-81f7-4aec-91b0-0bd6bb2fd5f0 |
| rms.workorder.partition | 45 |
| rms.workorder.task | 9bf49904-aeb0-4e46-973d-16c74db43731 |
| vsystem.tenant | tenant |
| vsystem.user | admin |
| vsystem.vid | cd0eebea-d56f-4475-9c2e-a1ae4d30df04 |

> Process: ID=1 | environment=production

SpanID: 8d58f8f093bf631

FIG. 8C

DISTRIBUTED TRACING IN A MICROSERVICES-BASED SYSTEM

BACKGROUND

With the advent of cloud-based applications, new cloud-based environments have been designed for automating mass computer application, deployment, and management. In these cloud-based environments, solutions for computer application deployment commonly involves running numerous microservices. Microservices divides a large and complex system into smaller, independent, and loosely coupled parts, thus fault isolation and scalability can be improved. For example, cloud-based data processing systems may run multiple instances of each microservice and application. As a result, numerous service instances must share the load of the tasks the service instances are assigned to execute.

However, it can be challenging and difficult to debugging errors associated with microservices. A logging process is commonly performed to debugging errors associated with microservices. The logging process is a process of using logs generated by applications to centrally track error reporting and related data. It is a manual and time-consuming process to identify the root cause of issues due to a large amount of logs without a standard format and across multiple microservices.

BRIEF DESCRIPTION OF THE DRAWINGS

The accompanying drawings are incorporated herein and form a part of the specification.

FIGS. 8A-8E illustrate example graphical user interfaces for monitoring distributed tracing in a computing system comprising a plurality of microservices, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing distributed tracing in a computing system comprising a plurality of services. As described above, it may be a manual and time-consuming process to identify one or more root causes of issues due to a large amount of logs without a standard format and across multiple microservices. Therefore, a technological solution is needed to discover issues and rapidly identify the root causes of errors across multiple microservices.

The technological solution in the present disclosure can provide a distributed tracing solution for a distributed microservices-based system. Distributed tracing may include a process of following a request from an endpoint to an endpoint as the request flowing through services in a distributed system. Distributed tracing may pinpoint exactly where a problem or error occurred associated with the request.

Figure 1:
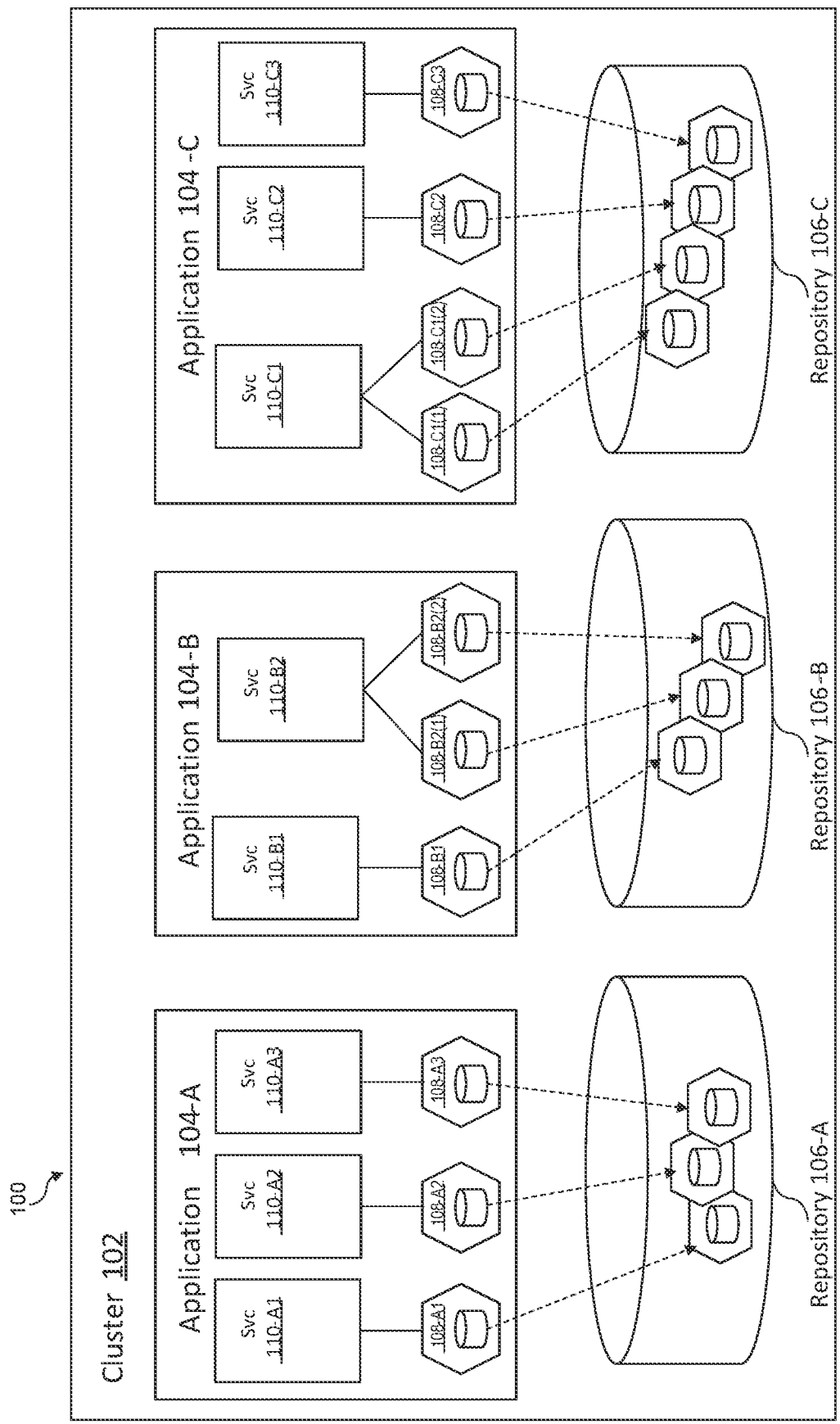
FIG. 1 is a block diagram illustrating a cloud-based data management system, according to some embodiments.

FIG. 1 is a block diagram illustrating a cloud-based data management system, according to some embodiments. System 100 is an example embodiment of a cloud-based data management system. It is noted, however, cloud-based data management system 100 is provided solely for illustrative purposes, and is not limiting. Embodiments of this disclosure may be implemented using and/or may be part of system different from and/or in addition to cloud-based data management system 100, as will be appreciated by persons skilled in the relevant art(s) based on the teachings contained herein. An example of the cloud-based data management system 100 shall now be described.

System 100 contains one or more applications 104 (104-A, 104-B, 104-C, . . . , 104-X, . . . ). Each application 104 may be a distributed application comprising microservices 110 (110-A1, 110-A2, 110-A3, . . . , 110-X1 . . . ). Each microservice 110 may have several service instances 108 (108-A1, 108-A2, 108-A3, . . . , 108-B2(1), 108-B2(2), . . . ). Applications 104 may be cluster managed by a cluster orchestrator. Cluster 102 may simultaneously host and run multiple applications 104. The set of applications 104 in a cluster 102 can be dynamic, in which the composition of each application 104 may change over time (e.g., due to upgrades) and the set of applications 104 themselves may also change over time.

In order to store the underlying data in a cloud orchestrator, system 100 can use a per-application repository 106 (106-A, 106-B, 106-C, . . . 106-X, . . . ). An entire application 102 can be used as the unit while storing application data in a repository 106. System 100 can store the data from all the service instances 108 in a single repository 106, such as an object store bucket. Data in a service instance 108 may all belong to the same application 104 and data from different applications 104 may be stored in separate repositories 106. The data may be located in separate service instances 108 each with their own access restrictions.

Figure 2:
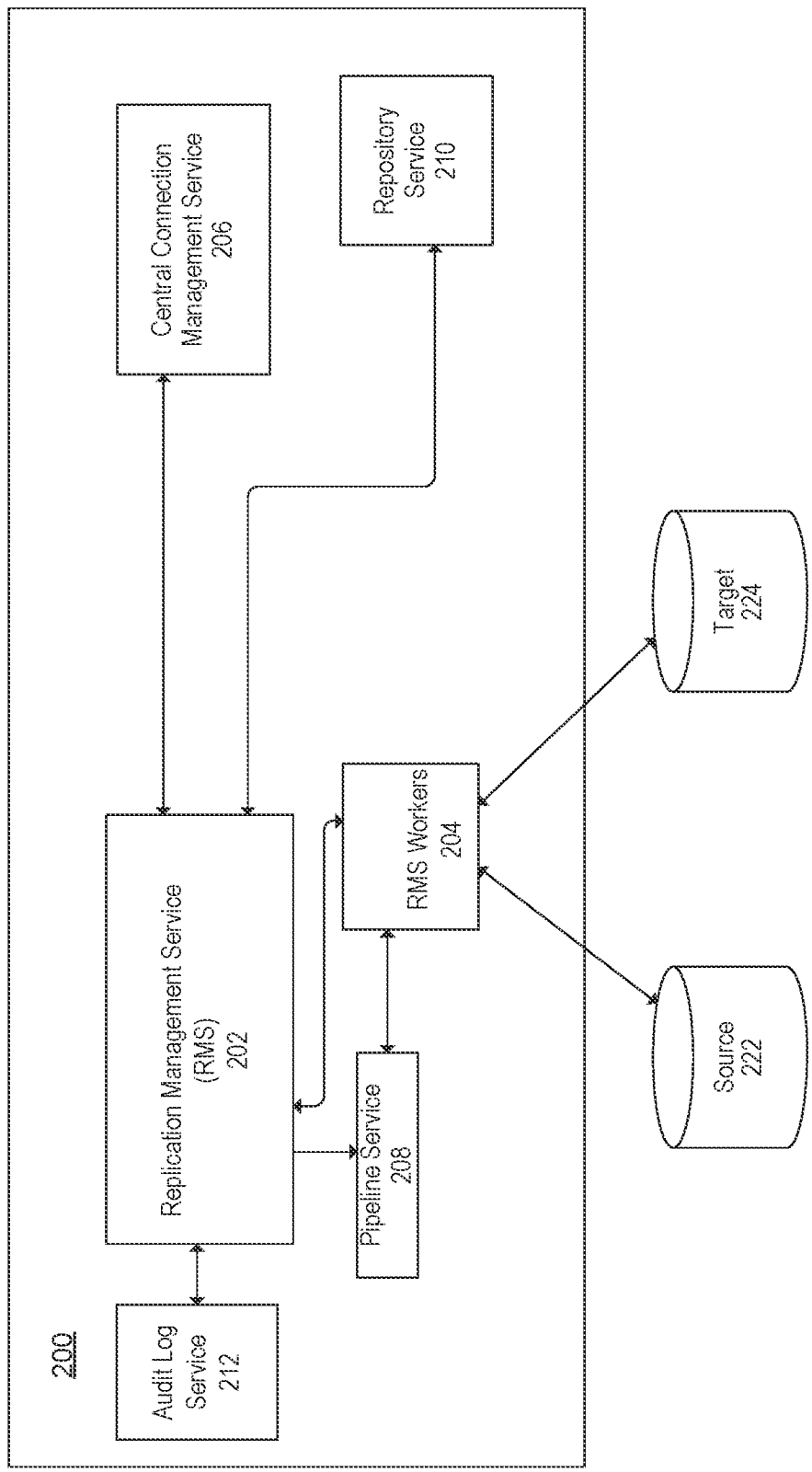
FIG. 2 is a block diagram illustrating an example cloud-based data management system for providing replication management service, according to some embodiments.

FIG. 2 is a block diagram illustrating an example cloud-based data management system 200 for providing replication management service, according to some embodiments. It is noted, however, cloud-based data management system 200 is provided solely for illustrative purposes, and is not limiting. Embodiments of this disclosure may be implemented using and/or may be part of system different from and/or in addition to cloud-based data management system 200, as will be appreciated by persons skilled in the relevant art(s) based on the teachings contained herein. An example of the cloud-based data management system 200 shall now be described.

System 200 may include, for example, system 100 in FIG. 1. System 200 may include a data intelligence cloud system to provide comprehensive data management. System 200 may perform replication and/or transformation of distributed data. In one example, system 200 can replicate data from a source system (e.g., source 222) into a target system (e.g., target 224) so that the target system can process the data. In some embodiments, FIG. 2 illustrates an exemplary microservice architecture for providing replication management service.

System 200 includes multiple microservices, including Replication Management Service (RMS) 202, RMS Workers 204, Central Connection Management (CCM) Service 206, Pipeline Service 208, Repository Service 210 and Audit Log service 212.

In some embodiments, RMS 202 can include a shared cloud service which can process different replication workloads and/or requests simultaneously. RMS 202 can communicate with other microservices, such as for example, RMS Workers 204, CCM Service 206, Pipeline Service 208, Repository Service 210, Audit Log service 212 by one or more requests, such as HTTP requests. RMS Workers 204 can be associated with or included in Pipeline service 208. RMS Workers 204 can include and/or act as a pipeline or graph to execute one or more replicate tasks or sub-tasks (e.g., work order) replicating data from a source system to a target system. RMS Workers 204 as a pipeline may be managed (e.g., create/delete/start/stop) within pipeline services. RMS Workers 204 may send a request to Pipeline service 208 to start one or more RMS workers to replicate data in parallel according to the work load. Pipeline service 208 may provide one or more design-time services and run-time services for a user to design pipeline and execute pipeline respectively.

In some embodiments, CCM service 206 can include a connection management service to provide a central directory for connection information and/or credentials. Pipeline service 208 (e.g., vFlow service) may allow different microservices in a flow to share data. Pipeline service 208 may start with an input to the flow and collect inputs and outputs from subsequent services in the flow. Pipeline service 208 may select one or more tasks from one or more task queues and execute the one or more sub-tasks. Repository Service 210 can provide a database service, such as a HANA database. Audit Log service 212 can include a service to provide audit logging to record the occurrence of an event in the system 200, the time at which it occurred, the responsible service or system, and the impacted service or system.

In some embodiments, source 222 and/or target 224 may include a system, an application and/or a database. In one example, data may be replicated from source 222 to target 224. In one example, source 222 and/or target 224 may include one or more database or files in one or more file types, including for example, Azura, HANA, Kafka and/or object store.

RMS 202, RMS Workers 204, CCM Service 206, Pipeline Service 208, Repository Service 210 and/or Audit Log service 212 may be associated with an application, including for example, one or more applications 104 in FIG. 1. The Application can include an application to provide replication management service.

Figure 3:
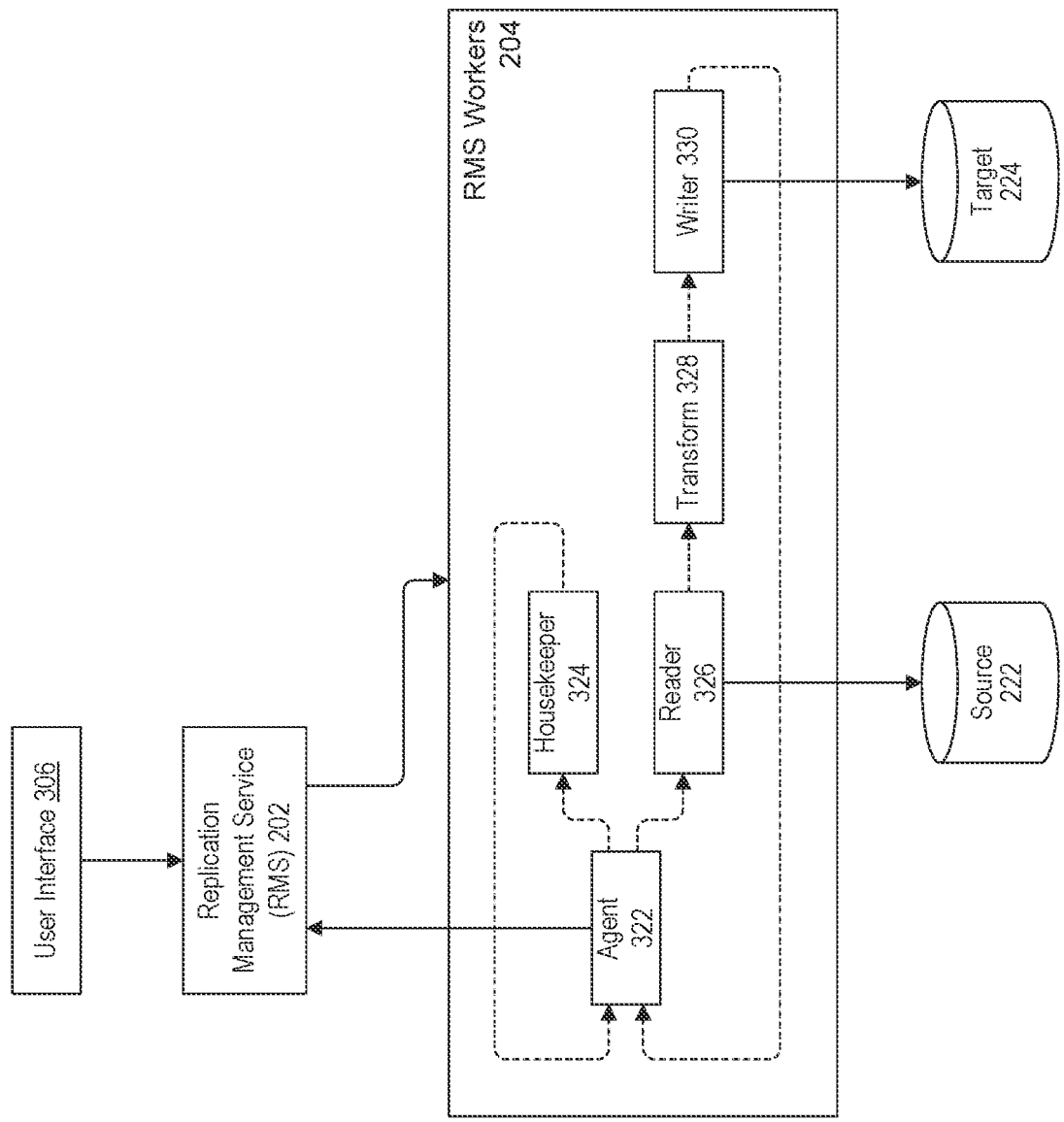
FIG. 3 is a block diagram illustrating an example microservice to provide replication management service in a cloud-based data management system, according to some embodiments.

FIG. 3 is a block diagram illustrating an example microservice to provide replication management service in a cloud-based data management system, according to some embodiments. It is noted, however, the example microservice is provided solely for illustrative purposes, and is not limiting. Embodiments of this disclosure may be implemented using and/or may be part of system different from and/or in addition to the example microservice, as will be appreciated by persons skilled in the relevant art(s) based on the teachings contained herein. An example microservice, RMS Workers 204 shall now be described.

RMS Workers 204 includes one or more operators, including Agent 322, Housekeeper 324, Reader 326, Transform 328, and Writer 330. In one example, an operator may be a piece of code, a script, or a rule. The one or more operators may have a preprogrammed action to be carried out on a data packet. The preprogrammed action may be user-defined.

In one example, Agent 322 may be responsible for communication with RMS 202. Agent 322 may send a request to receive one or more work orders from RMS 202 and post the work order status to RMS 202 after work orders are processed by RMS Workers 204. Agent 322 may send housekeeper work orders to Housekeeper 324 and send transfer work orders to Reader 326.

In one example, Housekeeper 324 may process one or more housekeeper orders including for example, setup, partition, and cleanup work orders. Housekeeper 324 may send back the work order status to Agent 322.

In one example, Reader 326 may read data from source 222. In one example, Transform 328 may perform one or more data transformation, such as one or more projections, and/or conversions of data types.

In one example, Writer 330 may write data to target 224. Writer 330 may send the work order status back to Agent 322.

In one example, RMS Workers 204 may execute one or more replication tasks to perform data replication and/or one or more related sub-tasks, such as including auto-partitioning, initial load, CDC replication, and/or housekeeping. In one example, a replication task may include a task that transfers data from a source system to a target system. A replication task may be divided into one or more sub-tasks (i.e., work orders). The one or more sub-tasks or work orders may include a work order of setup. The work order of setup may include a work order to check validity of artifacts of a replication task in a source system and a target system.

In one example, the one or more sub-tasks or work orders may include a work order of partition. The work order of partition may divide a dataset into one or more partitions. The work order of partition may be independently executed and may be scheduled in parallel.

In one example, the one or more sub-tasks or work orders may include a work order of transfer. The work order of transfer may schedule a transfer of data per partition and monitor a transfer progress.

In one example, the one or more sub-tasks or work orders may include a work order of cleanup. The work order of cleanup may perform cleanup tasks. In one example, the one or more work orders may include a housekeeper work order and/or a transfer work order. A housekeeper work order may include a work order of setup, partition, and cleanup. A transfer work order may include a work order of transfer to perform data replication from a source system to a target system.

In one example, the one or more work orders may include runnable tasks that can be scheduled by RMS 202. One or more work orders may be assigned to RMS Workers 204 to run in Pipeline Service 208. RMS Workers 204 may have multiple service instances and the one or more work orders may be assigned to different service instances. In each phase of a replication task, one or more work orders may be generated to perform the replication task. In one example, RMS Workers 204 may execute a replication graph (e.g., a full-context application topology graph) utilizing Pipeline Service 208. In one example, the replication graph may include one or more operators to compute and/or react to data. Pipeline Service 208 may receive a request from RMS 202 to manage the execution (e.g., start/stop) of one or more pipelines (e.g., RMS workers 204). RMS 202 may manage the creation and scheduling of one or more tasks or sub-tasks by handling requests from one or more agents (e.g., Agent 322). For example, when RMS 202 receives a "GetWorkOrder" request from Agent 322, RMS 202 may check the status of a task in the request and send a response to Agent 322 with one or more correct orders. In some examples, if there are available replication tasks to be performed, RMS 202 may send a request to Pipeline Service 208 to start RMS Workers 204. After RMS Workers 204 is running, RMS Workers 204 may start to send a request to RMS 202 to request work orders to be processed. If there are no more replication tasks to be performed, RMS 202 may send a request to Pipeline Service 208 to stop running RMS Workers 204.

In some embodiments, each of Agent 322, Housekeeper 324, Reader 326, Transform 328, and Writer 330 may communicate with each other in RMS Workers 204 by one or more messages. In some embodiments, Agent 322 may communicate with RMS 202 by one or more requests, such as including HTTP requests. Reader 326 may communicate with source 222 by one or more requests, such as including HTTP requests. Writer 330 may communicate with target 224 by one or more requests, such as including HTTP requests.

In one example, one or more messages can be sent between Agent 322, Housekeeper 324, Reader 326, Transform 328, and Writer 330 in RMS Worker 204. An example message may contain two fields "header" and "payload" shown as below in Table 1:

TABLE 1

An example message between operators
Message

+ header: map[string]interface{ }
+ payload: [ ][ ]interface{ }
+ Header( ): map[string]interface{ }
+ Payload( ): [ ][ ]interface{ }

In one example, the field of header may include a string of "map" including information associated with a work order and a work order status. A work order may include the work order definition. A work order status may include the work order status and can be updated by each of Agent 322, Housekeeper 324, Reader 326, Transform 328, and Writer 330 when the work order is completed. A work order status may indicate a status of the work order as succeeded or failed. In one example, the field of payload may store the data to be transmitted or received.

In one example, a user interface 306 may include a graphical user interface for monitoring distributed tracing associated with RMS 202 and RMS Workers 204, according to some embodiments. The graphical user interface may be discussed further with reference to FIGS. 8A-8E.

Figure 4:
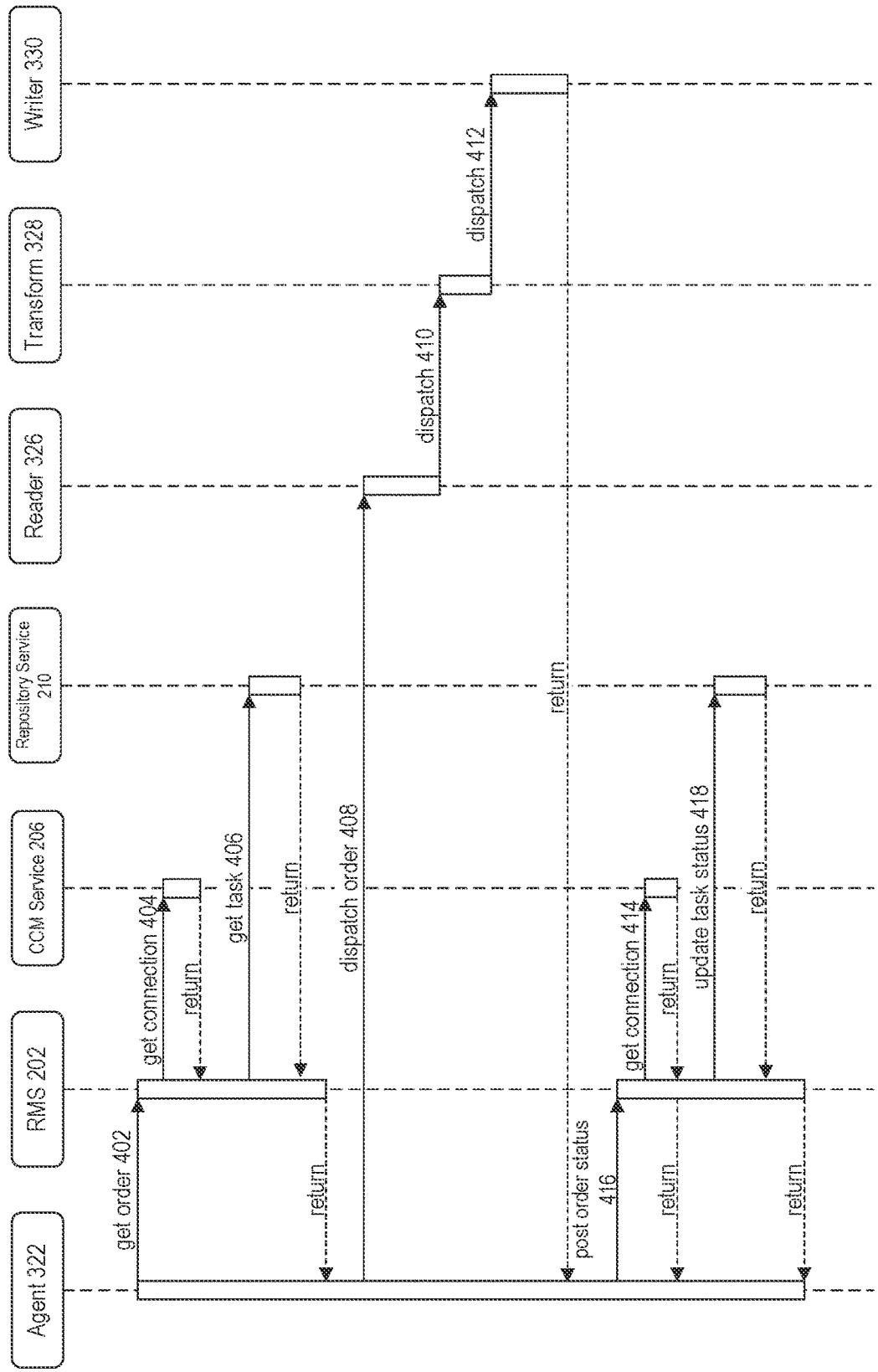
FIG. 4 is a flow diagram that illustrates an exemplary process for providing distributed tracing in a microservices-based system, according to some embodiments.

FIG. 4 is a flow diagram that illustrates an exemplary process for providing distributed tracing in a microservices-based system, according to some embodiments. Process 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Process 400 shall be described with reference to FIGS. 1-3. For example, process 400 may represent the operation of providing distributed tracing in a microservices-based system (e.g., system 200). However, process 400 is not limited to that example embodiment.

In some embodiments, a distributed tracing process may start with a request (e.g., get order 402) sent by Agent 322.

As shown in FIG. 4, Agent 322 sends a request by performing an operation of get order 402 to receive a work order from RMS 202. RMS 202 sends a request by performing an operation of get connection 404 to CCM Service 206 to receive connection information. RMS 202 sends a request by performing an operation of get task 406 to receive a task from Repository Service 210. RMS 202 can create a work order and send the work order to Agent 322. Agent 322 dispatches the work order by performing an operation of dispatch order 408 to Reader 326.

Reader 326 performs an operation of dispatch 410 to dispatch the work order to Transform 328 after loading data from a source system. Transform 328 performs an operation of dispatch operation 412 to dispatch the work order to Writer 330 after transforming the data. Writer 330 may dispatch the work order status to Agent 322 after writing data into a target system.

Agent 322 posts the work order status by performing an operation of post order status 416 to RMS 202. RMS 202 sends a request by performing an operation of get connection 414 to CCM Service 206 to receive connections. RMS 202 sends a request to Repository Service 210 to update the task status by performing an operation of update task status 418. Agent 322 may receive a response from RMS 202.

The distributed tracing process may end with the response received by Agent 322.

Figure 5:
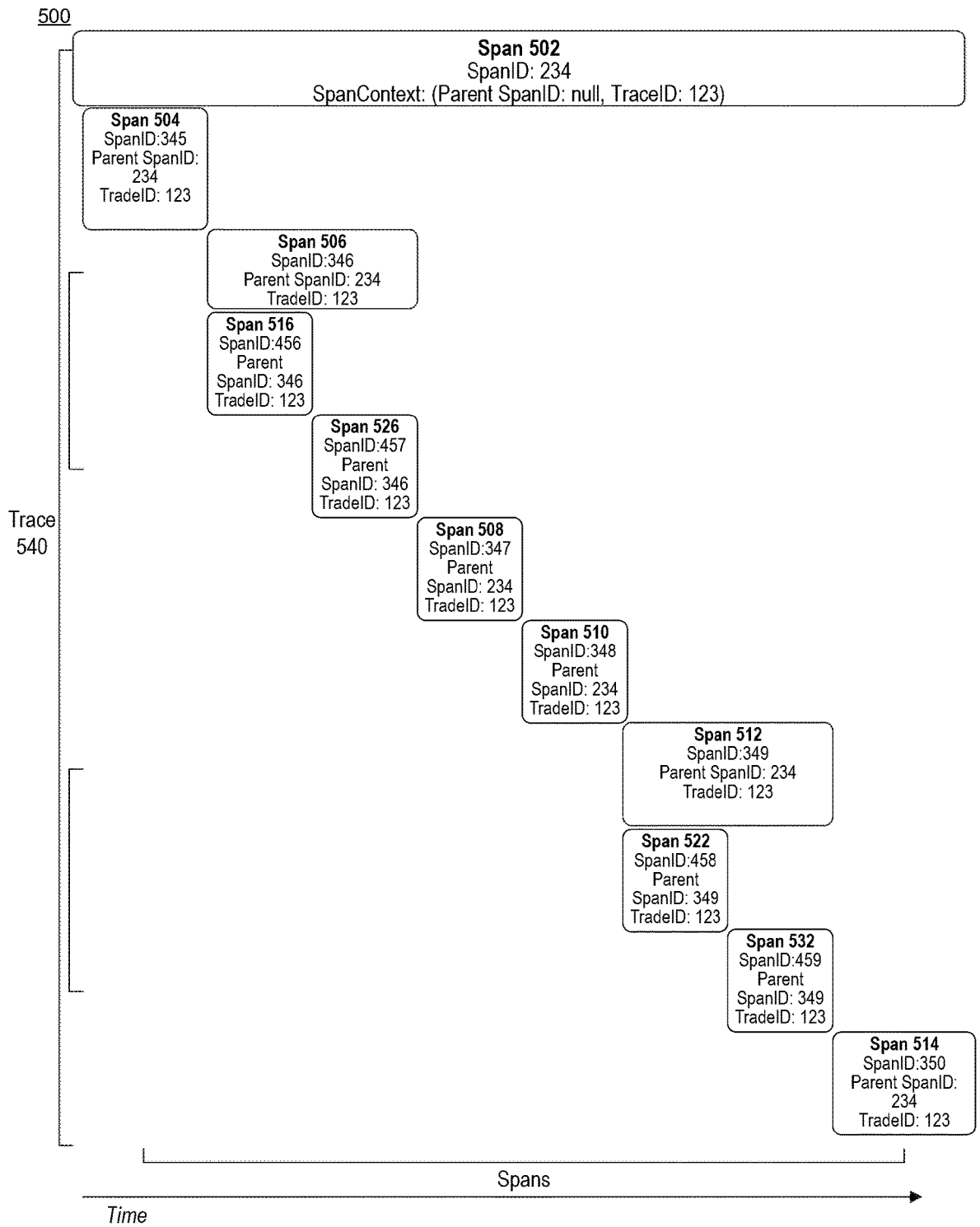
FIG. 5 illustrates an exemplary trace and span diagram for providing distributed tracing in a microservices-based system, according to some embodiments.

FIG. 5 illustrates an exemplary trace and span diagram for providing distributed tracing in a microservices-based system, according to some embodiments. Process 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Process 500 shall be described with reference to FIGS. 1-4. For example, process 500 may represent the operation of providing distributed tracing in a microservices-based system (e.g., system 200). However, process 500 is not limited to that example embodiment.

As shown in FIG. 5, trace and span diagram 500 includes a span 502 associated with a trace 540. Span 502 includes span 504, span 506, span 508, span 510, span 512, span 514, span 516, span 526, span 522, and span 532.

In some embodiments, distributed tracing can include a method of tracking a request, such as an application request or an API request, sent through microservices in distributed systems. The distributed tracing can be implemented by a single set of APIs, agents, collector services, and/or libraries to capture distributed traces and metrics.

In some embodiments, distributed tracing may involve one or more traces and/or spans. A trace can include a complete processing of a request associated with an application and/or a system. The trace may represent an entire journey of the request as the request moving through all of the services or components of a distributed system. All trace events generated by the request may share a trace ID that can be used to organize, filter and search for specific traces. Each trace may include one or more spans.

In some embodiments, a span can include an activity and/or operation performed within one or more individual services or components of a distributed system. Each span can include an individual step during the processing of the request. Each span may include a unique span ID, metadata, and/or other annotations. A trace may start with a root span when a request starts. The root span may have one or more child spans. Each of the one or more child spans may have child spans.

In some embodiments, context (e.g., trace context) of a span may be propagated to a child span of the span in a context propagation process. The context may contain several pieces of information that can be passed between functions inside a process and/or between processes. The context may indicate, to the child span, information related to parent span (e.g., Parent SpanID) and which trace the child span belongs to (e.g., TraceID). The child span may create an ID associated with the child span and then propagate the Parent SpanID and the ID associated with the child span in the context to its child span. The child span may propagate the TraceID in the context to its child span. In the context propagation process, a context can be sent with the execution flow and can be used to correlate the events involved in the process. The context propagation process can include metadata propagation. The context propagation process can include propagation of TraceID, SpanID, Parent SpanID and/or other data such as including, tags and/or attributes.

In some embodiments, span 502 can be a root span in a trace tree. A trace tree can have one span that does not have a parent and, that is, the root span. It can be followed by one or more child spans. A root span can include a TraceID, a SpanID, and NULL Parent SpanID. A child span can include the same TraceID as the parent span, a SpanID and a Parent span ID associated with the parent span.

In some embodiments, span 504, span 506, span 508, span 510, span 512, span 514 can be child spans of the parent span, span 502. Span 516, span 526 can be child spans of parent Span 506. Span 522 and span 532 are child spans of parent span, span 512.

As described above, a distributed tracing process in the example flow diagram 400 may start with a request sent by Agent 322 to receive a work order. The example flow diagram 400 may end with a response received by Agent 322 after posting the work order status to RMS 202. Span 502 may be associated from the start to the end of the distributed tracing process. Each of span 504, span 506, span 508, span 510, span 512, span 514, span 516, span 526, span 522, and span 532 may be associated with a step or operation in example flow diagram 400 in FIG. 4.

For example, span 504 may include a step of Agent 322 sending a request to receive work order from RMS 202. Span 506 may include a step of RMS 202 sending the request to CCM Service 206 to receive connection information and to receive task from Repository Service 210. Span 516 may include a step of RMS 202 sending the request to CCM Service 206 to receive connection information. Span 526 may include a step of RMS 202 sending the request to Repository Service 210 to receive a task. Span 508 may include a step of Reader 326 loading data from a source system. Span 510 may include a step of Transform 328 transforming the data. Span 512 may include a step of RMS 202 posting the work order status. Span 522 may include a step of CCM Service 206 receiving connections and sending a request to Repository Service 210. Span 522 may include a step of CCM Service 206 retrieving connection information. Span 532 may include a step of Repository Service 210 updating the task status. Span 514 may include a step of Agent 322 posting the work order status to RMS 202 and receiving a response from RMS 202.

In some embodiments, a work order can be sent to one or more operators in RMS Workers 204 to process asynchronously. A span may start when Agent 322 sends a request to RMS 202 to receive a work order. The span may end when Agent 322 receives a response after posting the work order status to RMS 202. Thus, Agent 322 may need to store a list of spans as a map span, with one span for each work order. In addition, SpanID can be injected into message header and can be retrieved. For example, Agent 322 may store a first span of a first work order in a map. After Agent 322 receives a response after posting the first work order status to RMS 202, Agent 322 may identify the first span by SpanID from the map. Then, the first span may end. In one example, Agent 322 may store a second span of a second work order in the map. After Agent 322 receives a response after posting the second work order status to RMS 202, Agent 322 may identify the second span by SpanID from the map. Then, the second span may end.

Figure 6:
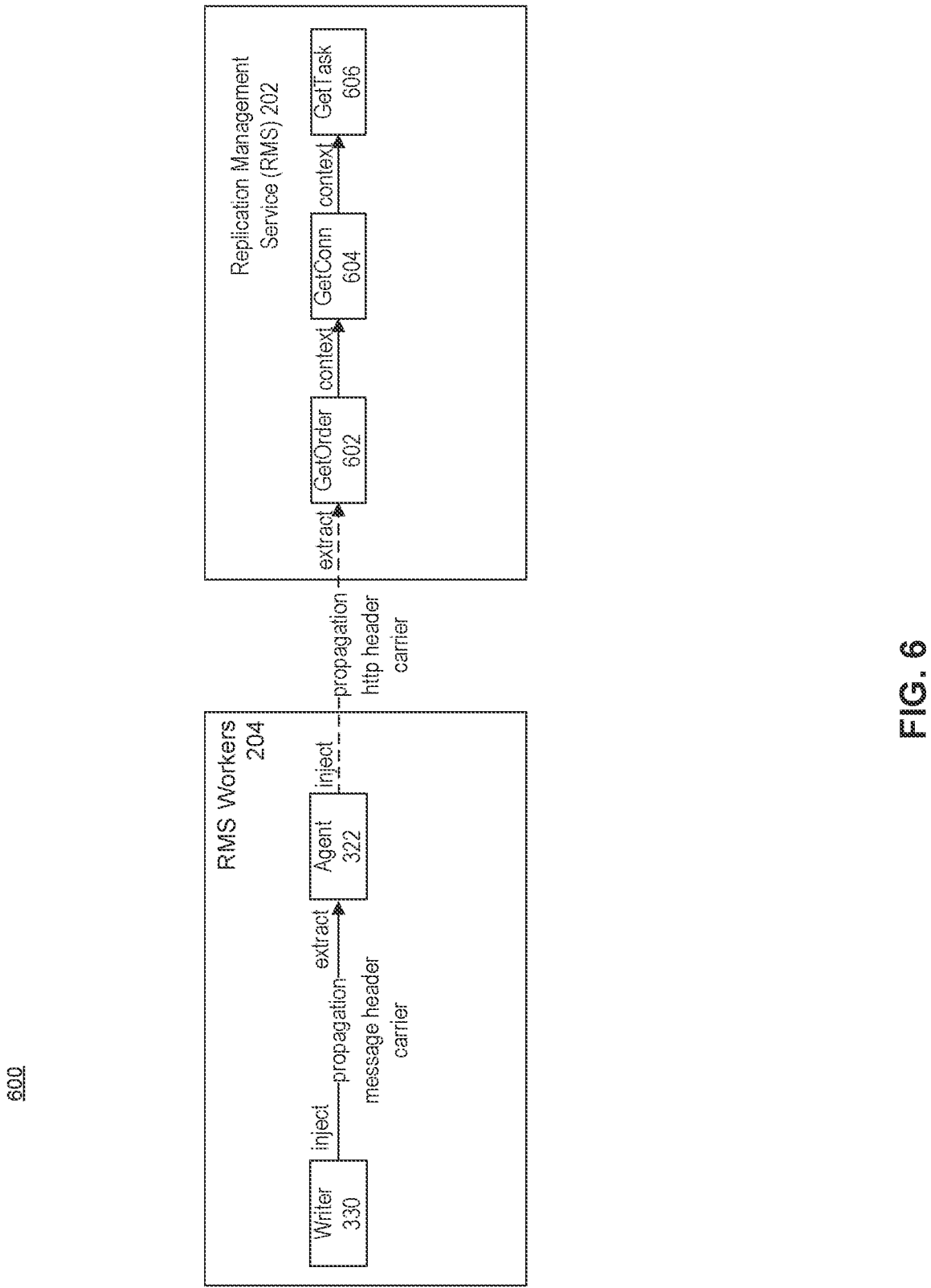
FIG. 6 illustrates an exemplary trace context propagation diagram for providing distributed tracing in a microservices-based system, according to some embodiments.

FIG. 6 illustrates an exemplary trace context propagation diagram for providing distributed tracing in a microservices-based system, according to some embodiments. Process 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Process 600 shall be described with reference to FIGS. 1-5. For example, process 600 may represent the operation of providing distributed tracing in a microservices-based system (e.g., system 200). However, process 600 is not limited to that example embodiment.

As described above, distributed tracing may involve one or more traces and/or spans. A span can include an activity and/or operation performed within one or more individual services or components of a distributed system. Trace context of a span may be propagated to a child span of the span in a context propagation process. The trace context may contain several pieces of information that can be passed between functions inside a process and/or between processes. Context propagation can include a mechanism by which a context object (e.g., metadata) passes in a transaction between and across components in microservices. Metadata collected from multiple components may be reassembled into a coherent trace capturing what happened in that specific flow.

As described with reference to FIGS. 4-5, a distributed tracing process in the example flow diagram 400 may start with a request sent by Agent 322 to receive a work order. For example, span 504 may include a step of Agent 322 sending a request to receive a work order from RMS 202. In one example, trace context of span 504 can be propagated by distributed propagation.

In some embodiments, trace context may be propagated from a first microservice (e.g., RMS Workers 204) to a second microservice (e.g., RMS 202) in distributed propagation. Metadata can be passed along with a header of an HTTP request from the first microservice to the second microservice. Trace context between the first microservice and the second microservice can be propagated by injection and extraction of an HTTP header carrier. In one example, an example distributed propagation between RMS 202 and RMS Workers 204 may be performed as below:

1. Agent 322 may inject trace context into a header in an HTTP request.
2. Agent 322 may send an HTTP request to RMS 202.
3. RMS 202 may receive the HTTP request.
4. RMS 202 may extract the trace context from the header in the HTTP request.
5. RMS 202 may one or more propagate context objects among one or more functions within RMS 202.

In some embodiments, injection may include a process of serializing a context object into headers. Extraction may include deserializing headers into a context object. A propagator may include an object to identify the details about how to serialize and deserialize the context. A carrier may carry trace context for propagation between microservices or processes. The carrier may provide one or more methods to set and get <key, value> pair. An example HTTPHeaderCarrier is shown in Table 2, which can be used for distributed propagation.

TABLE 2

An example HTTPHeaderCarrier
HTTPHeaderCarrier

+ GET(key string): string
+ Set(key string, value string):
+ Keys( ): [ ]string

In some embodiments, trace context may be propagated between a first operator (e.g., Agent 322) and a second operator (e.g., Writer 330) in a microservice (e.g., RMS Workers 204) in an inter-process propagation. The inter-process propagation may propagate context between processes. In RMS Workers 204, trace context may be propagated within a header of a message between operators. Trace context between operators within RMS Workers 204 may be propagated by injection and extraction of message header carriers. In one example, trace context between operators within RMS Workers 204 may be propagated by injection and extraction of a message header carrier.

In one example, an example inter-process propagation may be performed as below:

1. Agent 322 may receive a message from an input, such as a message from Writer 330.
2. Agent 322 may extract trace context into a context object.
3. Agent 322 may pass the context object through functions within Agent 322.
4. Agent 322 may process the message within Agent 322.
5. Agent 322 may inject the trace context into a message header.
6. Agent 322 may send a message with the trace context in the message header to output.

A carrier, such as a MessageHeaderCarrier, may carry trace context for an Inter-process propagation. A MessageHeaderCarrier is shown in Table 3 as below.

TABLE 3

An example MessageHeaderCarrier
MessageHeaderCarrier

+ Get(key string): string
+ Set(key string, value string):
+ Keys( ): [ ]string

In some embodiments, trace context may be propagated by a context object between functions in a microservice (e.g., RMS 202) in an in-process propagation. The in-process propagation may propagate metadata between functions inside a process and/or microservice. One or more logical operations can be performed in microservice associated with a request. For example, within RMS 202, a function of GetOrder 602 may call a function of GetConn 604 and/or a function of GetTask 606. The context object can be used to be propagated between different functions.

Figure 7:
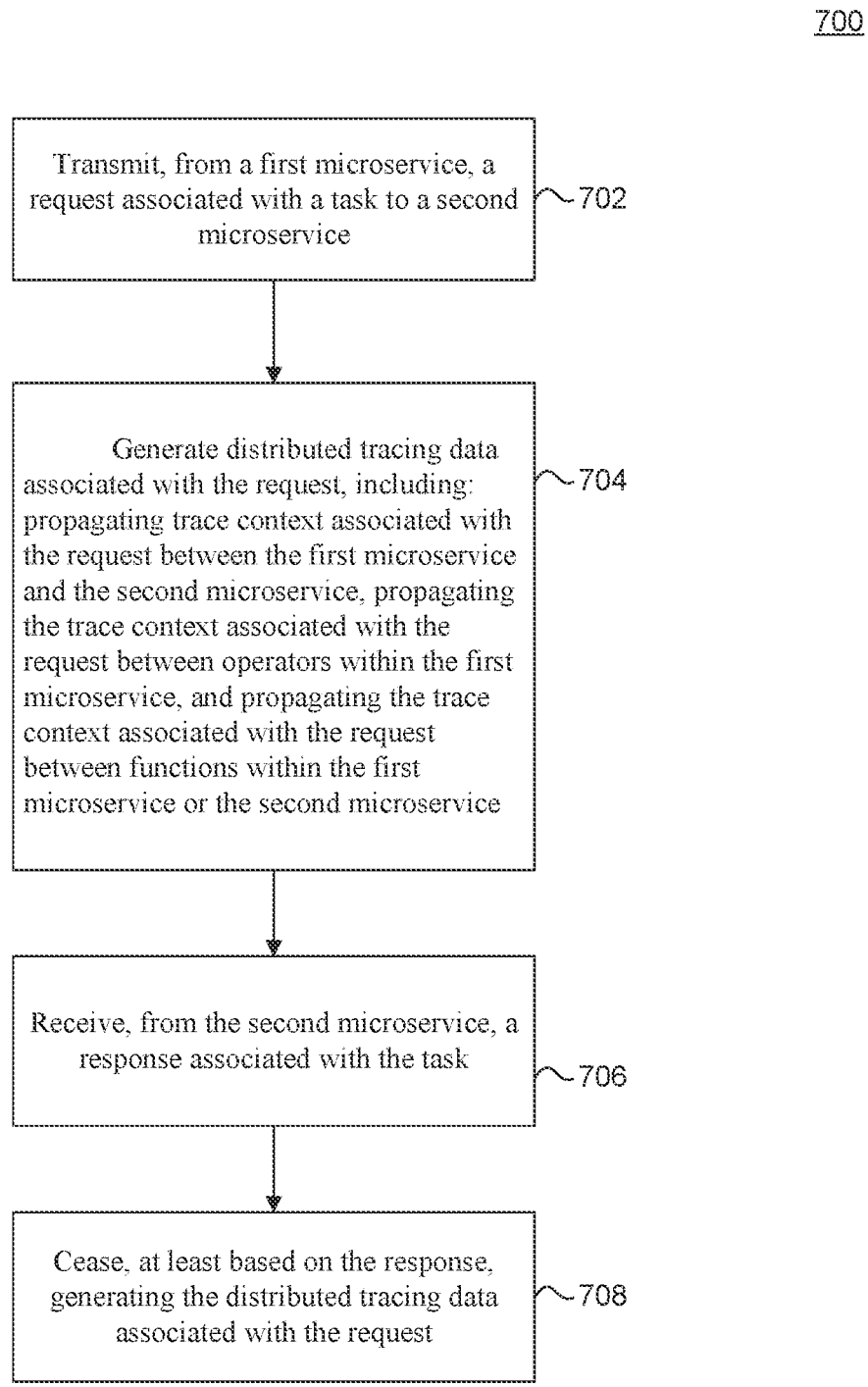
FIG. 7 is a flowchart for a method 700 for providing distributed tracing in a computing system comprising a plurality of microservices, according to some embodiments.

FIG. 7 is a flowchart for a method 700 for providing distributed tracing in a computing system comprising a plurality of microservices, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 7, as will be understood by a person of ordinary skill in the art. Method 700 shall be described with reference to FIGS. 1-6. However, method 700 is not limited to that example embodiment.

In step 702, a first microservice transmits a request associated with a task to a second microservice. In one example, the first microservice can include RMS Workers 204 and the second microservice can include RMS 202. The task may include a task to process replication workloads. In one example, the request may include a request transmitted by Agent 322 to receive a work order from RMS 202. The request may include an HTTP request.

In step 704, distributed tracing data associated with the request is generated to propagate trace context associated with the request between the first microservice and the second microservice, to propagate trace context associated with the request between operators within the first microservice; and to propagate trace context associated with the request between functions within the first microservice or the second microservice.

In some embodiments, trace context associated with the request can be propagated between the first microservice and the second microservice by combing (e.g., injecting) the trace context into an HTTP header carrier associated with the request, and extracting the trace context from the HTTP header carrier associated with the request.

In some embodiments, trace context associated with the request can be propagated between operators within the first microservice by combing (e.g., injecting) the trace context into a message header carrier associated with the request, and extracting the trace context from the message header carrier associated with the request.

In some embodiments, trace context associated with the request can be propagated between functions within the first microservice or the second microservice by propagating a context object associated with the request between functions within the first microservice or the second microservice.

In some embodiments, the context object may include a unique identifier and metadata associated with the request between functions within the first microservice or the second microservice.

In some embodiments, the trace context may include a first identifier including a TraceID. In one example, the TraceID may identify a set of correlated events associated with the request. The trace context may include a second identifier including a SpanID. In one example, the SpanID may identify an event in the set of correlated events.

In some embodiments, the trace context may include a third identifier including a Parent SpanID. In one example, the Parent SpanID may identify a causal relationship between the set of correlated events associated with the request.

In step 706, the first microservice receives, from to the second microservice, a response associated with the task. In one example, Agent 322 may receive a response from RMS 202 for an updated work order status.

In step 708, at least based on the response, generating the distributed tracing data is ceased associated with the request.

FIGS. 8A-8E illustrate example graphical user interfaces for monitoring distributed tracing in a computing system comprising a plurality of microservices, according to some embodiments. It is noted, however, FIGS. 8A-8E are provided solely for illustrative purposes, and is not limiting. Embodiments of this disclosure may be implemented using and/or may be part of graphical user interfaces different from and/or in addition to the example graphical user interfaces, as will be appreciated by persons skilled in the relevant art(s) based on the teachings contained herein.

FIG. 8A illustrates a list of traces in graphical user interface 810. In one example, each trace of the list may be associated with a work order processing. Graphical user interface 810 may display the number of spans, errors if there are any, the associated microservices, and the total time spent for a trace.

Figure 8B:
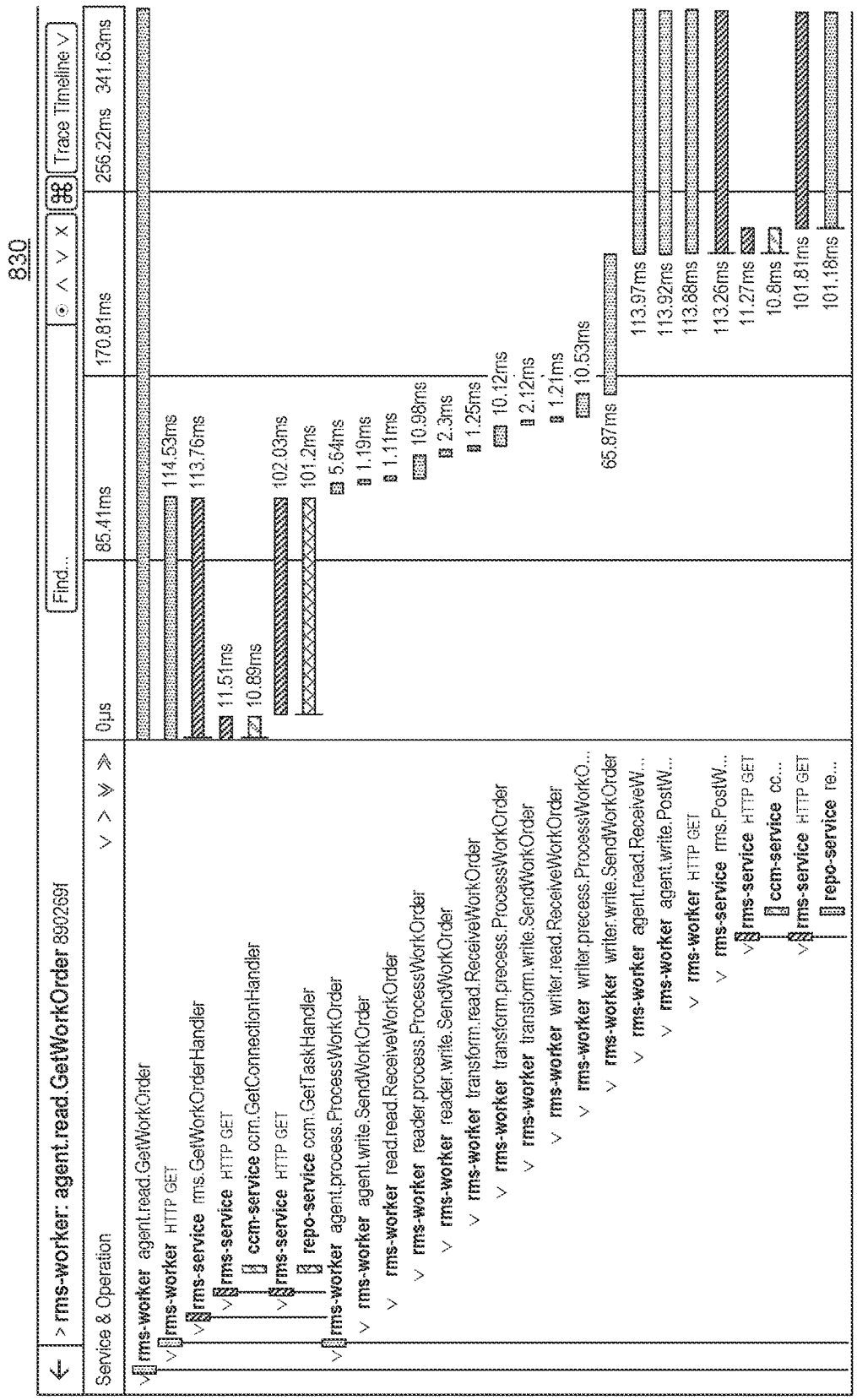

FIG. 8B illustrates a detailed distributed tracing for a work order in graphical user interface 830, after a user interaction (e.g., click) with one of the traces in graphical user interface 810. In one example, FIG. 8B illustrates that distributed tracing may start with a step of agent.GetWorkOrder and end with receiving response of a step of agent.PostWorkOrderStatus. In one example, FIG. 8B illustrates that time spent for each span or function.

FIG. 8C illustrates one or more attributes that can be set for a span in graphical user interface 850. The one or more attributes, such as workorder id, task id, vid may be searched by a user.

Figure 8D:
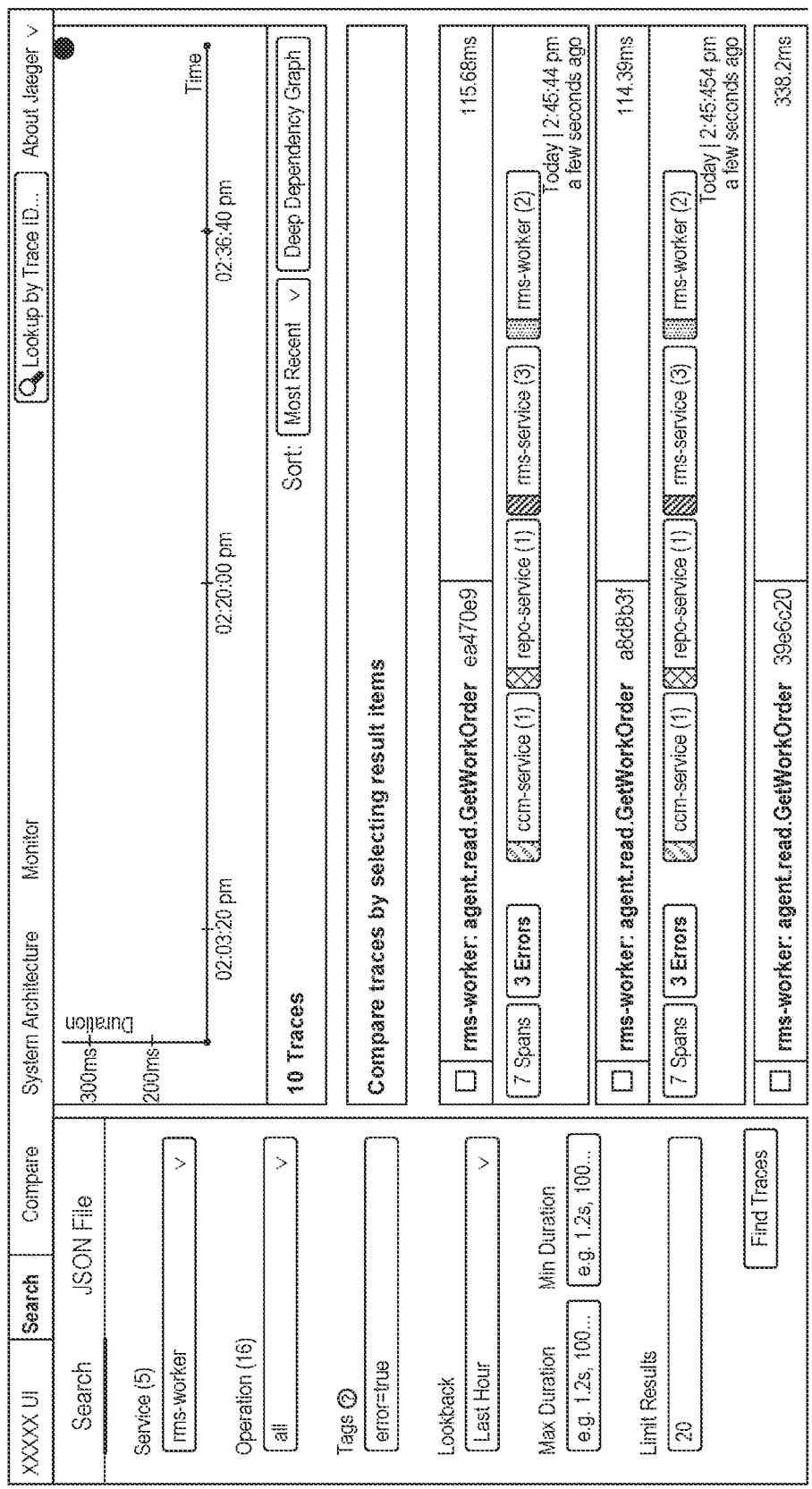

FIG. 8D illustrates one or more traces with errors in order to identify issues in graphical user interface 870. One or more traces with error may be displayed when a user searches in graphical user interface 870 for tags with error=true.

Figure 8E:
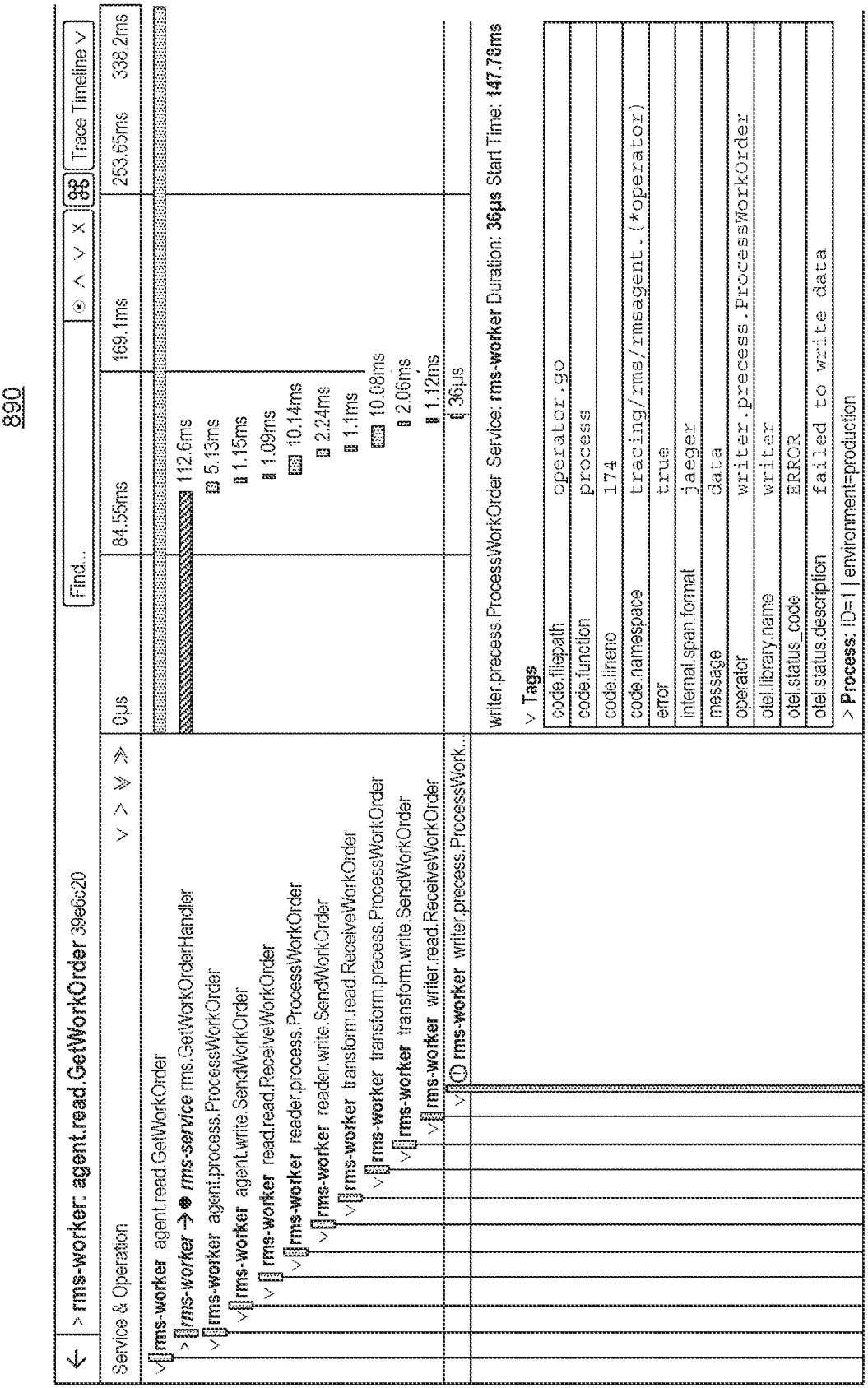

FIG. 8E illustrates information associated with an error from graphical user interface 870. Graphical user interface 890 may display information associated with the error, such as a root cause for the error, and/or the function information.

In some embodiments, one or more attributes, event, and/or a log within a span may be added and/or filtered by a user. In some embodiments, one or more added errors within a span may be added and and/or filtered by a user.

Figure 9:
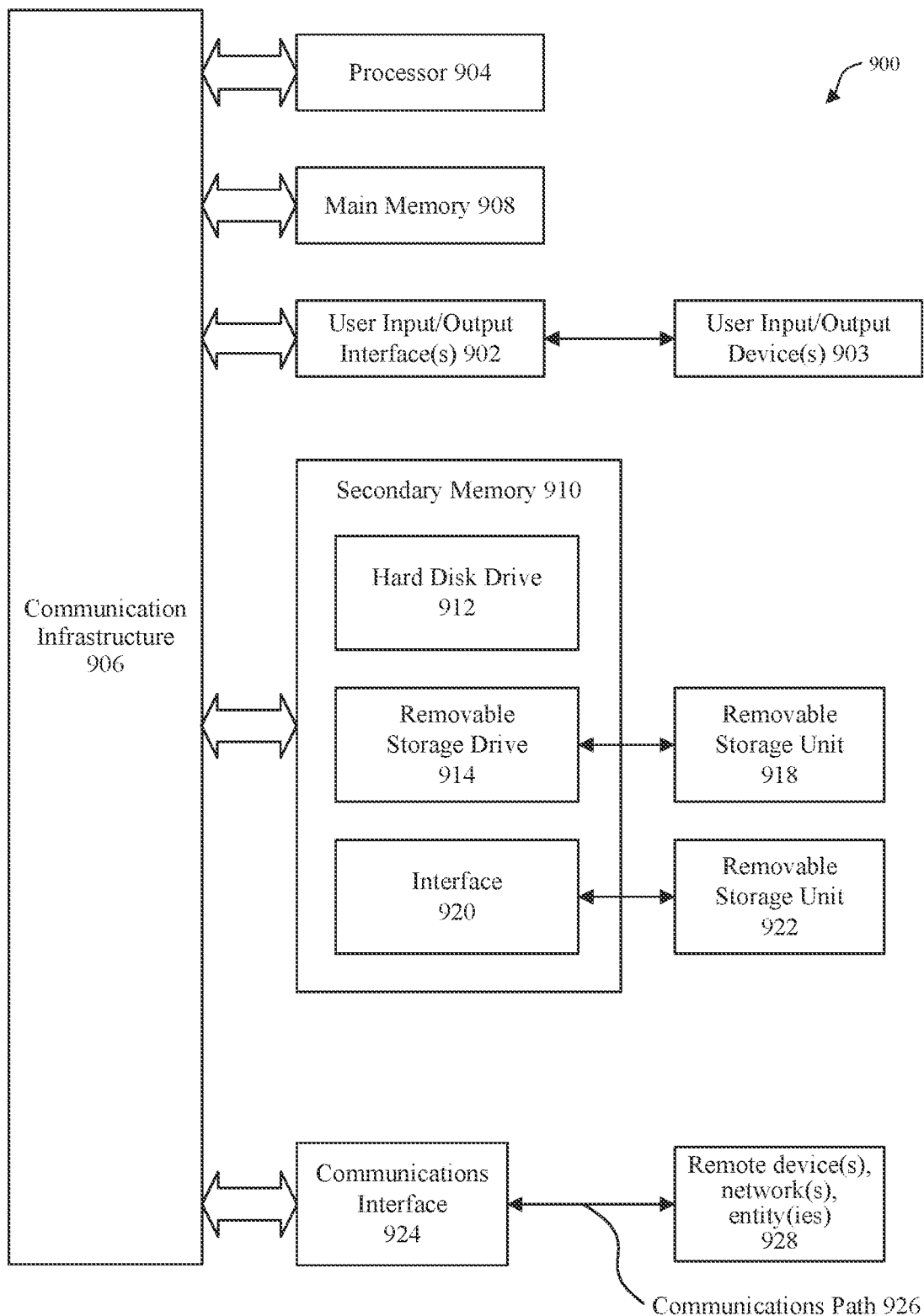
FIG. 9 is an example computer system useful for implementing various embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900 or processor(s) 904), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for providing distributed tracing in a computing system comprising a plurality of microservices, the computer implemented method comprising:
   transmitting, from a first microservice, a request associated with a task to a second microservice;
   generating distributed tracing data associated with the request, comprising:
      propagating trace context associated with the request between the first microservice and the second microservice;
      propagating the trace context associated with the request between operators within the first microservice; and
      propagating the trace context associated with the request between functions within the first microservice or the second microservice, wherein the trace context comprises: a first identifier identifying a set of correlated events associated with the request; and a second identifier identifying an event in the set of correlated events:
   receiving, from the second microservice, a response associated with the task; and ceasing, at least based on the response, generating the distributed tracing data associated with the request, wherein at least one of the transmitting, generating, receiving and ceasing are performed by one or more computing systems.

2. The method of claim 1, wherein the propagating the trace context associated with the request between the first microservice and the second microservice comprises:
combing the trace context into an HTTP header carrier associated with the request; and
extracting the trace context from the HTTP header carrier associated with the request.

3. The method of claim 1, wherein the propagating the trace context associated with the request between operators within the first microservice comprises:
combing the trace context into a message header carrier associated with the request; and
extracting the trace context from the message header carrier associated with the request.

4. The method of claim 1, wherein the propagating the trace context associated with the request between functions within the first microservice or the second microservice comprises:
propagating a context object associated with the request between functions within the first microservice or the second microservice.

5. The method of claim 4, wherein the context object comprises: a unique identifier and metadata associated with the request between functions within the first microservice or the second microservice.

6. The method of claim 1, wherein
the first identifier comprises a TraceID; and
the second identifier comprises a SpanID.

7. The method of claim 1, wherein the trace context further comprises:
a third identifier comprising a Parent SpanID, wherein the Parent SpanID identifies a causal relationship between the set of correlated events associated with the request.

8. A system for providing distributed tracing in a computing system comprising a plurality of microservices, comprising:
a memory; and
at least one processor coupled to the memory and configured to:
transmit, from a first microservice, a request associated with a task to a second microservice;
generate distributed tracing data associated with the request, wherein to generate the distributed tracing data, the at least one processor is configured to:
propagate trace context associated with the request between the first microservice and the second microservice;
propagate the trace context associated with the request between operators within the first microservice; and
propagate the trace context associated with the request between functions within the first microservice or the second microservice, wherein the trace context comprises: a first identifier identifying a set of correlated events associated with the request; and a second identifier identifying an event in the set of correlated events;
receive, from the second microservice, a response associated with the task; and
cease, at least based on the response, generating the distributed tracing data associated with the request.

9. The system of claim 8, wherein to propagate the trace context associated with the request between the first microservice and the second microservice, the at least one processor is configured to:
combine the trace context into an HTTP header carrier associated with the request; and
extract the trace context from the HTTP header carrier associated with the request.

10. The system of claim 8, wherein to propagate the trace context associated with the request between operators within the first microservice, the at least one processor is configured to:
combine the trace context into a message header carrier associated with the request; and
extract the trace context from the message header carrier associated with the request.

11. The system of claim 8, wherein to propagate the trace context associated with the request between functions within the first microservice or the second microservice, the at least one processor is configured to:
propagate a context object associated with the request between functions within the first microservice or the second microservice.

12. The system of claim 11, wherein the context object comprises: a unique identifier and metadata associated with the request between functions within the first microservice or the second microservice.

13. The system of claim 8, wherein
the first identifier comprises a TraceID; and
the second identifier comprises a SpanID.

14. The system of claim 8, wherein the trace context further comprises:
a third identifier comprising a Parent SpanID, wherein the Parent SpanID identifies a causal relationship between the set of correlated events associated with the request.

15. A non-transitory computer-readable medium having instructions stored thereon that, when executed by at least one computing device, cause the at least one computing device to perform operations comprising:
transmitting, from a first microservice, a request associated with a task to a second microservice;
generating distributed tracing data associated with the request, comprising:
propagating trace context associated with the request between the first microservice and the second microservice;
propagating the trace context associated with the request between operators within the first microservice; and
propagating the trace context associated with the request between functions within the first microservice or the second microservice, wherein the trace context comprises: a first identifier identifying a set of correlated events associated with the request; and a second identifier identifying an event in the set of correlated events;
receiving, from the second microservice, a response associated with the task; and
ceasing, at least based on the response, generating the distributed tracing data associated with the request.

16. The non-transitory computer-readable medium of claim 15 wherein the propagating the trace context associated with the request between the first microservice and the second microservice comprises:
combing the trace context into an HTTP header carrier associated with the request; and
extracting the trace context from the HTTP header carrier associated with the request.

17. The non-transitory computer-readable medium of claim 15, wherein the propagating the trace context associated with the request between operators within the first microservice comprises:
   combing the trace context into a message header carrier associated with the request; and
   extracting the trace context from the message header carrier associated with the request.

18. The non-transitory computer-readable medium of claim 15, wherein the propagating the trace context associated with the request between functions within the first microservice or the second microservice comprises: propagating a context object associated with the request between functions within the first microservice or the second microservice.

19. The non-transitory computer-readable medium of claim 18, wherein the context object comprises: a unique identifier and metadata associated with the request between functions within the first microservice or the second microservice.

20. The non-transitory computer-readable medium of claim 15, wherein the trace context comprises:
   the first identifier comprises a TraceID; and
   the second identifier comprises a SpanID.

\* \* \* \* \*